United States Patent
Kamerbeek et al.

(10) Patent No.: US 11,058,249 B2
(45) Date of Patent: Jul. 13, 2021

(54) SYSTEM, CAPSULE AND METHOD FOR PREPARING A BEVERAGE

(71) Applicant: Koninklijke Douwe Egberts B.V., Utrecht (NL)

(72) Inventors: Ralf Kamerbeek, De Meern (NL); John Henri Flamand, Lunteren (NL); Angenita Dorothea van Loon-Post, Utrecht (NL); Hendrik Cornelis Koeling, Amersfoort (NL); Arend Cornelis Jacobus Biesheuvel, Werkendam (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 204 days.

(21) Appl. No.: 14/245,747

(22) Filed: Apr. 4, 2014

(65) Prior Publication Data
US 2014/0220205 A1    Aug. 7, 2014

Related U.S. Application Data

(63) Continuation of application No. 13/327,554, filed on Dec. 15, 2011, now abandoned, which is a
(Continued)

(30) Foreign Application Priority Data

Jun. 17, 2009  (EP) .................... 09163008

(51) Int. Cl.
*A47J 31/40* (2006.01)
*A47J 31/36* (2006.01)
*B65D 85/804* (2006.01)

(52) U.S. Cl.
CPC .......... *A47J 31/407* (2013.01); *A47J 31/368* (2013.01); *B65D 85/8043* (2013.01)

(58) Field of Classification Search
CPC .. B65D 85/8043; B65D 85/804; A47J 31/407; A47J 31/368
(Continued)

(56) References Cited

U.S. PATENT DOCUMENTS

| 3,445,237 | A | 5/1969 | Gidge |
| 4,136,202 | A | 1/1979 | Favre |

(Continued)

FOREIGN PATENT DOCUMENTS

| CA | 2072289 | 1/1993 |
| CA | 2072300 | 1/1993 |

(Continued)

OTHER PUBLICATIONS

Permeable Definition. Merriam Webster Dictionary. Apr. 25, 2009. Retrieved from Internet URL: <https://web.archive.org/web/20090425054538/http://www.merriam-webster.com/dictionary/permeable>.*

(Continued)

*Primary Examiner* — Erik Kashnikow
*Assistant Examiner* — Ashley Axtell
(74) *Attorney, Agent, or Firm* — Foley & Lardner LLP

(57) ABSTRACT

A system including a capsule is usable for preparing a predetermined quantity of beverage suitable for consumption using an extractable product. The system includes a substantially rigid circumferential wall, a bottom closing the circumferential wall at a first end, and lid of a flexible sheet-shaped perforate and/or porous material closing the circumferential wall at a second, open, end opposite the bottom. The circumferential wall, the bottom and the lid enclose an inner space include the extractable product, and the lid includes an impermeable outer circumferential area and an exit area being enclosed by said impermeable outer circumferential area such that, in use, the prepared beverage (Continued)

is drained from the capsule through the exit area. The invention further relates to a method for preparing said beverage using the above system.

22 Claims, 3 Drawing Sheets

Related U.S. Application Data continuation of application No. PCT/NL2009/050821, filed on Dec. 30, 2009.

(58) Field of Classification Search
USPC ........ 99/283, 295; 426/77, 78, 79, 425, 431, 426/432, 433, 435
See application file for complete search history.

(56) References Cited

U.S. PATENT DOCUMENTS

| | | | |
|---|---|---|---|
| 5,008,013 A | | 4/1991 | Favre et al. |
| 5,150,645 A | * | 9/1992 | Schiettecatte ....... A47J 31/4496 99/295 |
| 5,242,702 A | * | 9/1993 | Fond ................... A47J 31/0668 426/112 |
| 5,343,799 A | | 9/1994 | Fond |
| 5,402,707 A | * | 4/1995 | Fond ................... A47J 31/0678 99/295 |
| 5,897,899 A | * | 4/1999 | Fond ................... A47J 31/0678 426/112 |
| 6,499,388 B2 | | 12/2002 | Schmed |
| 6,869,627 B2 | | 3/2005 | Perkovic et al. |
| 7,153,530 B2 | * | 12/2006 | Masek ............... B65D 85/8043 426/112 |
| 7,412,921 B2 | * | 8/2008 | Hu ...................... A47J 31/0668 426/77 |
| 7,650,831 B2 | | 1/2010 | Denisart et al. |
| 7,685,930 B2 | | 3/2010 | Mandralis et al. |
| 7,946,217 B2 | | 5/2011 | Favre et al. |
| 2003/0056661 A1 | | 3/2003 | Hu et al. |
| 2004/0115310 A1 | * | 6/2004 | Yoakim ............... B65D 85/8046 426/77 |
| 2006/0110507 A1 | * | 5/2006 | Yoakim ............... B65D 85/8043 426/433 |
| 2008/0148958 A1 | | 6/2008 | Koeling et al. |
| 2009/0032454 A1 | | 2/2009 | Rapparini |
| 2009/0047389 A1 | | 2/2009 | Jarish et al. |
| 2009/0098253 A1 | | 4/2009 | Diaz Blanco |

FOREIGN PATENT DOCUMENTS

| | | | |
|---|---|---|---|
| CA | 2536750 C | 8/2004 | |
| CN | 1826071 A | 8/2006 | |
| CN | 1826072 A | 8/2006 | |
| CN | 1842288 A | 10/2006 | |
| CN | 1842289 A | 10/2006 | |
| CN | 1842290 A | 10/2006 | |
| CN | 101389551 A | 3/2009 | |
| EP | 0 521 397 | 1/1993 | |
| EP | 0 524 464 A1 | 1/1993 | |
| EP | 0 844 195 | 5/1998 | |
| EP | 1 163 869 A1 | 12/2001 | |
| EP | 1 344 722 B2 | 9/2003 | |
| EP | 1 654 966 B1 | 5/2006 | |
| EP | 9 155 575 | 3/2009 | |
| EP | 2 239 212 | 10/2010 | |
| EP | 2 364 930 | 9/2011 | |
| EP | 2 364 930 A2 | 9/2011 | |
| EP | 2 306 871 | 10/2012 | |
| FR | 2211924 A5 * | 7/1974 | ......... B65D 85/8043 |
| JP | 2007-517545 | 7/2007 | |
| WO | WO-93/17932 | 9/1993 | |
| WO | WO-2005/054080 | 6/2005 | |
| WO | WO-2006/043098 A1 | 4/2006 | |
| WO | WO-2008/117329 A1 | 10/2008 | |

OTHER PUBLICATIONS

Impermeable Definition. 1899. Oxford English Dicitonary. Retrieved from Internet URL: <http://www.oed.com/view/Entry/92312?redirectedFrom=impermeable#eid>.*
FR 2211924 Espacenet Translation.*
Communication pursuant to Rules 70(2) and 70a(2) EPC and reference to Rule 39(1) EPC for European Patent Application No. 13169730.2-1656, dated Sep. 9, 2013, 2 pages.
European Patent Office Notice of Opposition to EP2306871B1, dated Apr. 4, 2013, 16 pages.
European Search Report for EP Application No. 13139730, dated Jul. 17, 2013, 5 pages.
First Office Action for Chinese Patent Application No. 200980160943.8, dated Dec. 4, 2013, 8 pages.
Office Action for Korean Patent Application No. 10-2012-7001248, dated Sep. 5, 2013, 8 pages.
Search Report and Written Opinion for Singapore Patent Application No. 201109269-9, dated Feb. 13, 2013, 12 pages.
Search Report for Chinese Patent Application No. 200980160943.8, dated Nov. 22, 2013, 3 pages.
The Great Soviet Encyclopedia (1979): Chlorinated Polyolefin, http://encyclopedia2.thefreedictionary.com/Chlorinated Polyolefin, retrieved on Apr. 5, 2013, 2 pages.

* cited by examiner

SYSTEM, CAPSULE AND METHOD FOR PREPARING A BEVERAGE

CROSS-REFERENCE TO RELATED PATENT APPLICATIONS

This application is a continuation of application Ser. No. 13/327,554, filed Dec. 15, 2011, which is a continuation of International Patent Application PCT/NL2009/050821, filed Dec. 30, 2009, which claims priority to European Patent Application No. 09163008.7, filed Jun. 17, 2009, all of which are incorporated herein by reference.

BACKGROUND

The present invention relates generally to the field of The invention relates to a system for preparing a predetermined quantity of beverage suitable for consumption using an extractable product, comprising an exchangeable capsule, and an apparatus comprising a receptacle for holding the exchangeable capsule, and a fluid dispensing device for supplying an amount of a fluid, such as water, under pressure to the exchangeable capsule, wherein the exchangeable capsule comprises a circumferential wall, a bottom closing the circumferential wall at a first end, and a lid closing the circumferential wall at a second end opposite the bottom, wherein the wall, bottom and lid enclose an inner space comprising the extractable product, wherein the fluid dispensing device is arranged for supplying the fluid to the extractable product through the bottom for forming the beverage, wherein the receptacle comprises a support surface, and wherein the capsule is arranged to at least partly abut against the support surface for draining the prepared beverage from the capsule through the lid and through the support surface, wherein the lid comprises a flexible sheet-shaped perforate and/or porous material and the system comprises an outlet which, in use, is in fluid communication with the lid for draining the prepared beverage from the capsule and supplying the beverage to a container such as a cup.

Such a system using a capsule of which the lid comprises openings for draining prepared beverage from the capsule and supplying the beverage to a container is known per se. These capsules are known as open capsules, since the capsule itself has perforate or porous sections, thus, prior to use, being open to ambient atmosphere (although the open capsule can be contained in an e.g. airtight outer package). When using the open capsule in the apparatus of the system in the extended position, thus the position ready to supply fluid to the extractable product in the capsule, the open capsule is positioned in the receptacle, wherein the lid of the capsule faces the support surface and the bottom of the capsule faces the fluid dispensing device.

A drawback of the abovementioned system using an open capsule is that during fluid supply under pressure already prepared beverage may bypass the outlet of the system after passing the sheet-shaped perforate and/or porous lid. This means that part of the prepared beverage, possibly mixed with air available between the lid and the outlet of the system, may try to pass between the capsule and the support surface even though the capsule is pressed against the support surface.

SUMMARY

It is therefore an object of the invention to provide a system according to the above described type, wherein the advantages of the known system are maintained and the disadvantages of the known system are at least partly overcome. More in particular, it is an object of the invention to provide a system for preparing a predetermined quantity of beverage wherein the risk of bypassing of the prepared beverage after passing the sheet-shaped perforate and/or porous material is minimized.

Thereto, according to a first aspect of the invention, the above described system is characterized in that the lid comprises an impermeable outer circumferential area and an exit area being enclosed by said impermeable outer circumferential area such that the prepared beverage is drained from the capsule through the exit area.

By providing an impermeable outer circumferential area around an exit area intended for draining the prepared beverage from the capsule, the prepared beverage is actively forced to pass the exit area and subsequently the outlet of the system. Consequently, the risk of prepared beverage trying to pass between the lid of the capsule and the support surface of the receptacle is minimized. Thus, instead of for instance pressing the receptacle to the support surface with a higher pressing force, the system according to the present invention may more exactly guide the prepared beverage from the capsule towards the outlet of the system.

Preferably, according to a further aspect of the invention, the flexible sheet-shaped perforate and/or porous material is a flexible foil, such as a polymeric film, at least partly provided with a plurality of exit openings. Such flexible foil may for instance be a multilayer foil of polyethyleneterephthalate (PET-P) and chlorinated polypropylene (CPP) and according to further aspect of the invention comprise a first layer of PET-P with a thickness of approximately 15 µm and a second layer of CPP of approximately 30 µm. The multilayer foil may also comprise a first layer of PET-P with a thickness of approximately 12 µm and a second layer of CPP of approximately 30 µm.

In further elaboration of the invention, the plurality of exit openings is provided in a centre area of the lid, wherein the impermeable outer circumferential area of the lid does not comprise any exit opening. Hence, the lid comprising the exit area and the impermeable outer circumferential area can be provided in a simple manner.

In an alternative embodiment of the invention, on a side of the lid facing the support surface of the system, an additional substantially annular sealing member may be provided that forms the impermeable outer circumferential area of the lid. Such an annular sealing member can be easily attached to an outer surface of the lid after attaching the lid to the capsule. According to a further aspect of the invention, the lid and the annular sealing member may be of the same material. For instance an annular sealing member of the multilayer foil as described before may be connected, for instance by means of an adhesive or sealing it, to an outer side of the lid of the multilayer foil.

In another embodiment of the invention, it is also possible that the annular sealing member is of a resilient material such as a plastic, for instance PE or a rubber. The annular sealing member may be connected to a side of the lid facing the support surface of the receptacle by means of a suitable adhesive. Such a resilient sealing member can be used to advantage because upon closing of the receptacle, thus pressing the capsule against the support surface, the sealing member may be impressed a little thereby providing a tight seal between the lid and the support surface.

In order to further prevent the bypass between the support surface and the capsule it is advantageous according to a further aspect of the invention if the impermeable outer circumferential area extends from the circumferential wall radially inward, preferably over a radial distance between 1 mm-5 mm from the circumferential wall. Such a dimension of the impermeable outer circumferential area provides sufficient prevention against bypass of the prepared beverage and at the same time provides a sufficiently large exit area suitable to drain the prepared beverage from the capsule.

In further elaboration of the invention, the capsule preferably comprises an outwardly extending rim, wherein the lid is attached to the outwardly extending rim. Such a rim may have a radial length at a side facing the lid of approximately 0.2 mm±0.025 mm. Alternatively, such a rim may have a radial length at a side facing the lid of approximately 4.7 mm±0.1 mm The radial length can be defined as the dimension of the rim between an inner side of the circumferential wall of the capsule and the outer circumferential edge of the rim. Due to such a rim the upper part of the receptacle can easily press the capsule and thus the lid against the support surface of the receptacle upon displacement of the upper part of the receptacle towards the support surface.

According to another embodiment of the invention, the exit area may comprise 75-170 openings such as 100-170 openings, preferably 90-150 openings such as 110-150, more preferably 100-125 openings. Alternatively, the exit area may have approximately 145 openings. An opening diameter may be between 0.4 mm±0.05 mm and 0.2 mm±0.05 mm, preferably approximately 0.3 mm±0.05 mm. Due to said openings, the prepared beverage will leave the capsule with a desired speed such that the preparation time will not be too long, for instance no more than 40 seconds, preferably no more than 30 seconds. Such openings with such diameters also prevent roasted and ground coffee particles from leaving the capsule.

Optionally, the bottom of the capsule is permeable to liquid. Preferably, the bottom of the capsule is perforate and/or porous.

The invention further relates to a capsule according to claim 15, wherein the capsule may be a capsule of the above described system. The invention further relates to the use of a capsule for preparing a predetermined quantity of beverage in an apparatus of such a system.

The invention also relates to a method for preparing a predetermined quantity of beverage suitable for consumption using an extractable product, comprising: providing an exchangeable capsule, comprising a circumferential wall, a bottom closing the circumferential wall at a first end, and a lid closing the circumferential wall at a second end opposite the bottom, wherein the wall, bottom and lid enclose an inner space comprising the extractable product, providing an apparatus comprising a receptacle for holding the exchangeable capsule, a fluid dispensing device for supplying an amount of a fluid, such as water, under pressure to the exchangeable capsule, and an outlet which, in use, is in fluid communication with the capsule for draining the prepared beverage from the capsule and supplying the beverage to a container such as a cup, wherein the receptacle comprises a support surface, and wherein the capsule at least partly abuts against the support surface for draining the prepared beverage from the capsule through the lid and through the support surface, wherein the lid comprises a flexible sheet-shaped perforate and/or porous material and the apparatus comprises an outlet which is in fluid communication with the lid for draining the prepared beverage from the capsule and supplying the beverage to a container such as a cup, wherein the lid comprises an impermeable outer circumferential area and an exit area being enclosed by said impermeable outer circumferential area such that the prepared beverage is drained from the capsule through the exit area, wherein the method further comprises supplying the fluid to the extractable product for preparing the beverage.

Such a capsule and such a method provide similar advantages and effects as described with the system.

BRIEF DESCRIPTION OF THE DRAWINGS

The invention will now be further elucidated by means of, non-limiting, examples referring to the drawing, in which.

It is noted that identical or corresponding elements in the different drawings are indicated with identical or corresponding reference numerals.

DETAILED DESCRIPTION OF EXEMPLARY EMBODIMENTS

Figure 1:
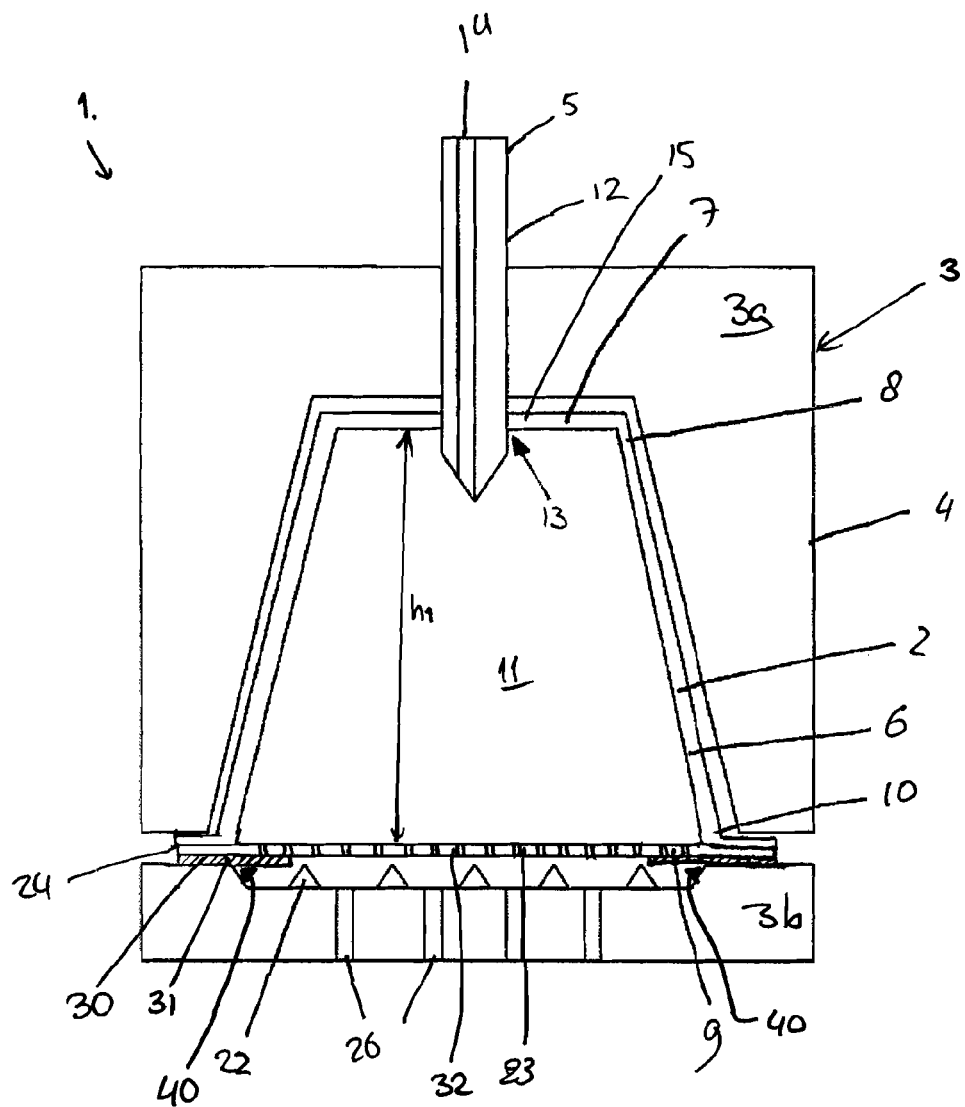
FIG. 1 shows a system for preparing a beverage according to a first embodiment of the invention.

FIG. 1 shows a system 1 for preparing a predetermined quantity of beverage suitable for consumption using an extractable product according to a first embodiment of the invention. The system 1 comprises an apparatus 4 comprising an exchangeable open capsule 2. The apparatus 4 comprises a receptacle 3 for holding the exchangeable open capsule 2. Commonly, the receptacle 3 has a shape at least partly complementary to the shape of the capsule 2. The apparatus 4 further comprises a fluid dispensing device 5 for supplying an amount of a fluid, such as water, under a pressure, of e.g. 9 bars, to the exchangeable capsule 2.

The exchangeable open capsule 2, as provided in the receptacle 3 of the apparatus 4, comprises a substantially rigid circumferential wall 6, a bottom 7 closing the circumferential wall 6 at a first end 8, and a lid 9 closing the circumferential wall 6 at a second end 10 opposite the bottom 7. The circumferential wall 6, the bottom 7 and the lid 9 enclose an inner space 11 comprising the extractable product. Preferably, the extractable product comprises an amount of roasted and ground coffee. In this example, the exchangeable capsule 2 comprises an amount of extractable product, e.g. approximately 5.0-6.5 grams of roasted and ground coffee, preferably of approximately 5.2 .grams±0.15 grams, suitable for preparing a single portion of the beverage, preferably a single cup of the beverage, e.g. from 30-200 ml of the prepared beverage.

In the shown embodiment of the system 1, the bottom 7, more specifically an entrance area 15 thereof, of the capsule 2 is adapted to, in use, being pierced by bottom piercing means 12 to provide a pierced opening 13 in the bottom 7. In use, fluid from the fluid dispensing device 5 is provided via bore 14 through the pierced opening 13 in the inner space 11 of the capsule.

According to the invention, the lid 9 of the capsule 2 comprises a flexible sheet-shaped perforate and/or porous material, in this embodiment a flexible foil such as a polymeric film with a plurality of openings 23 through which the beverage can drain from the capsule 2. The flexible foil may be a multilayer foil of a polyethyleneterephtalate (PET-P) layer of approximately 15 μm and a chlorinated plypropylene (CPP) layer of approximately 30 µm. Alternatively, The flexible foil may be a multilayer foil of a PET-P layer of approximately 12 µm and a chlorinated CPP layer of approximately 30 µm. Furthermore, the lid comprises an impermeable outer circumferential area 30 that encloses an exit area 32. The exit area 32 is adapted to drain prepared beverage from the capsule 2 to the outlet 26 of the system 1. Such a construction of the lid 9 prevents prepared beverage from bypassing the outlet 26 of the system (indicated by arrows 40) by guiding the prepared beverage through the exit area 32 and subsequently trough the outlet 26.

The impermeable outer circumferential area 30 of the lid 9 is formed by an additional substantially annular sealing member 31 that is attached to the side of the lid 9 facing the support surface 3b, for instance by gluing, welding and the like. In the shown embodiment, the annular sealing member is of a resilient material such as a plastic, for instance PE or a rubber. The annular sealing member 31 extends from the circumferential wall 6 radially inward, preferably over a radial distance L (see FIG. 3) between 1 mm-5 mm from the circumferential wall 6. The capsule 2 comprises an outwardly extending rim 24 to which the lid 9 is attached, for instance by gluing, welding and the like. A radial length 1 of the rim 24 (see FIGS. 3 and 4) at a side facing the lid 9 is approximately 4.7 mm±0.1 mm.

The apparatus 4 further comprises lid piercing means 22, here embodied as protrusions, intended for piercing the lid of a prior art closed capsule (not shown). According to the invention, the lid 9 is sufficiently strong and sufficiently stiff not to be pierced by the lid piercing means 22 of the system 1 under the influence of the pressure inside the capsule 2. Under influence of the pressure inside the capsule 2, lid 9 may deform against the lid piercing means 22, but it may not tear, rupture or be pierced by the lid piercing means, the lid 9 may stay intact under influence of the pressure. The bottom piercing means 12 and the upper part 3a of the receptacle as shown in FIG. 1 are in an extended position thereby pressing the capsule 2 against the support surface 3b of the receptacle 3.

The system 1 as shown in FIG. 1 is operated as follows for preparing a cup of coffee, wherein the extractable product is roasted and ground coffee.

The capsule 2 is placed in the receptacle 3. The upper part 3a of the receptacle 3 is extended towards the support surface 3b of the receptacle 3. Due to the displacement of the upper part 3a of the receptacle, the extended bottom piercing means 12 are activated to pierce the bottom 7 of the capsule 2 in order to provide an opening 13 in the bottom 7 as shown in FIG. 1. Upon displacement of the upper part 3a of the receptacle, the rim 24 of the capsule 2 and thus also the lid 9 connected thereto is pressed against the support surface 3b of the receptacle 3 of the apparatus 4. Then the fluid, here hot water under pressure, is supplied to the extractable product in the inner space 11 through the opening 13 via the bore 14 provided in the piercing means 12. The water will wet the coffee grounds and extract the desired substances to form the coffee beverage. The prepared coffee will drain from the capsule 2 through the exit area 32 of the lid 9 being guided by means of the impermeable outer circumferential area 30 towards openings 26 of the support surface 3b, and may be supplied to a container such as a cup (not shown).

Figure 2:
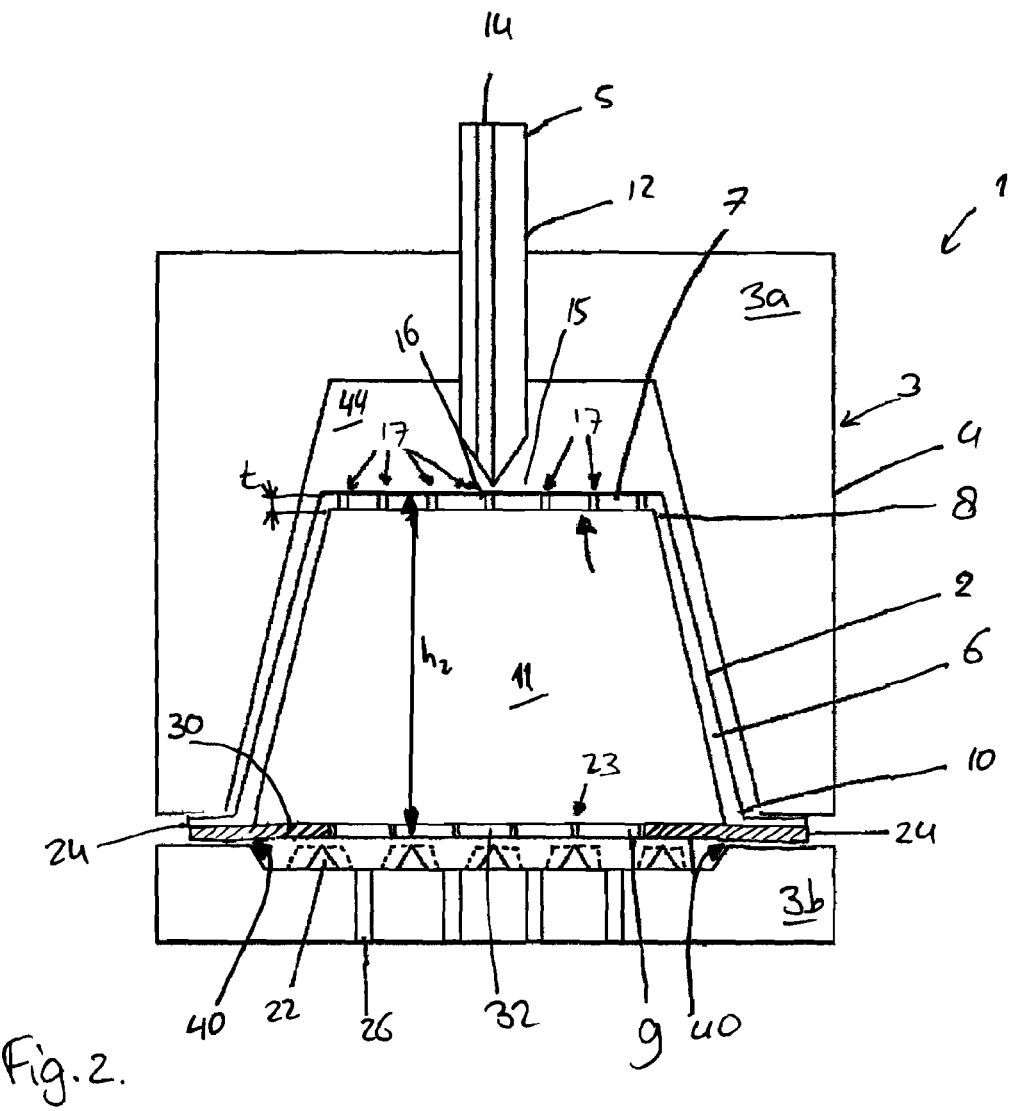
FIG. 2 shows a second embodiment of a system according to the invention.

In FIG. 2, a system 1 according to the invention is shown. For the sake of clarity, only the elements that differ from the system 1 as shown and described with FIG. 1 will be described here in detail.

The open capsule 2 comprises, according to the second embodiment of the invention, an entrance filter 15 in the bottom 7 of the capsule 2. The entrance filter 15 comprises an amount of openings 17 for supplying fluid from the fluid dispensing device 5 of the apparatus 4 to the inner space 11 of the capsule. Thus, the fluid is supplied to the extractable product via the plurality of entrance openings, which causes the extractable product to be wetted over substantially the entire cross section of the capsule 2. Hence, a very homogeneous supply of fluid to the extractable product is obtained. It will be appreciated that thus the bottom 7 is perforate and hence permeable to liquid. Alternatively, the bottom might be porous.

The open capsule has a height hl of approximately 23.7 mm±0.2 mm seen in an axial direction. Consequently, the entrance filter 15 in the bottom 7 is not pierced by the bottom piercing means 12 of the system 1 of the invention. The thickness t of the bottom 7 may be approximately 0.7 mm±0.05 mm.

During preparing of the beverage, the fluid from the fluid dispensing device 5 enters the cavity 44 provided between the receptacle 3 and the open capsule 2 through the bore 14. The entrance filter 15 is adapted to drain fluid from the cavity 44 to the inner space 11 of the open capsule 2 for extracting desired substances from the extractable product.

Thus, more in general, in the example of FIG. 1, the bottom 7 comprises an entrance area 16, formed by the entrance filter 15 which is positioned at a distance from the bottom piercing means 12. The apparatus 4 is arranged for bringing the fluid dispensing device 5 in fluid connection with the entrance area for supplying the fluid to the extractable product for preparing the beverage. In another (not shown) embodiment of the invention, the entrance filter 15 may be formed by a filtering paper, a flexible foil or the like material.

The circumferential wall 6 of the capsule 2 shown in FIG. 2 may, for example, comprise a plastics material and may be formed by, for example, injection moulding, vacuum-forming, thermoforming or the like. Also, in the example of FIG. 2, the circumferential wall 10 is frusto-conical, but other shapes are also possible. For example, the circumferential wall may be cylindrical or pyramidal. In the capsule 2 according to the system 1 of the invention, the impermeable outer circumferential area 30 is part of the lid 9 of the flexible foil which part does not comprise any exit opening. The impermeable outer circumferential area 30 may be formed by temporarily melting part of the perforated lid 9 such that the openings 23 that are located near the circumferential wall 6 closed. The impermeable outer circumferential area 30 may instead be provided by only providing openings 23 in the exit area 32 of the lid. Thus, the impermeable outer circumferential area 30 is provided in an easy manner. This integrated impermeable outer circumferential area 30 may comprise similar dimensions and materials as the annular sealing member 31 as described with FIG. 1.

Figure 3:
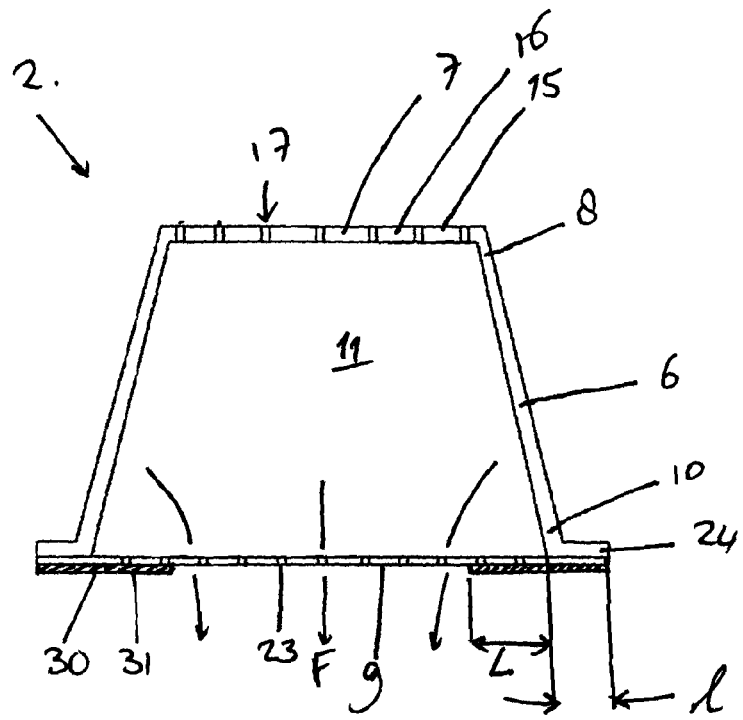
FIG. 3 shows a partial schematic cross sectional view of a capsule according to the invention.
Figure 4:
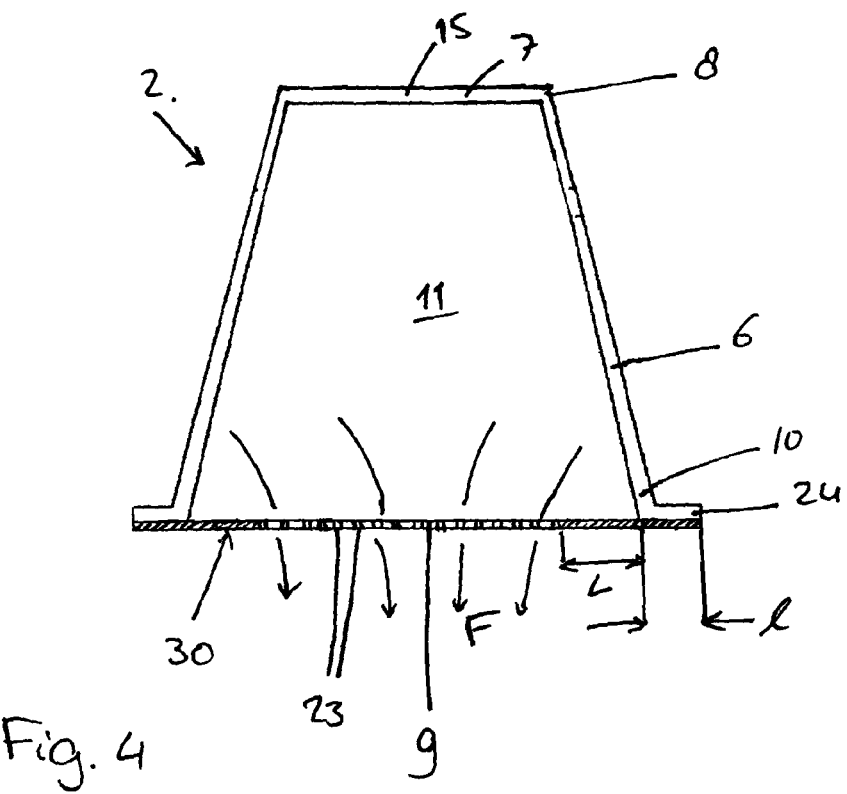
FIG. 4 shows a schematic cross sectional view of a second embodiment of a capsule according to the invention.

In FIGS. 3 and 4, two further embodiments of the capsule 2 according to the invention are shown. Said capsules 2 can be used in a system 1 according to the invention. For the sake of clarity, only the elements that differ from the system 1 as shown and described with FIGS. 1 and 2 are described here in detail. The capsule of FIG. 3 comprises an entrance filter 15 as described with the capsule 2 as shown in FIG. 2 and an impermeable outer circumferential sealing member 30 as described with the capsule 2 as shown in FIG. 1. The capsule of FIG. 4 comprises a bottom 7 intended to be pierced upon use as described with the capsule 2 as shown in FIG. 1 and an integrated impermeable outer circumferential area 30 as described with the capsule 2 as shown in FIG. 2.

In the foregoing specification, the invention has been described with reference to specific examples of embodiments of the invention. It will, however, be evident that various modifications and changes may be made therein without departing from the broader spirit and scope of the invention as set forth in the appended claims.

It is for instance possible that the entrance area of the capsule comprises different kinds of entrance filters. The capsule and parts thereof may be made of various materials, or various combinations of various materials. Also, the capsule may have various shapes. For example, the circumferential wall of the capsule may have any shape such as cylindrical, frustoconical or polygonal, such as hexagonal or octagonal. Also the bottom and the lid may have various shapes, including non flat shapes. Furthermore the receptacle may have different constructions as long as the upper part of the receptacle can be displaced to and retracted from the support surface such that the capsule can be pressed against the support surface and subsequently be released. The apparatus of the system can also have different support surfaces, for instance without protrusion but with a substantially flat surface or with surface having a three dimensional pattern or the like. The apparatus furthermore can have different fluid dispensing device adapted to supply fluid to the inner space of the capsule in different ways.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. An apparatus for preparing a beverage suitable for consumption using an extractable product, comprising an exchangeable open capsule, a receptacle for holding the exchangeable open capsule and a fluid dispensing device for supplying an amount of fluid under pressure to the exchangeable open capsule, wherein the exchangeable open capsule comprises a circumferential wall, a bottom closing the circumferential wall at a first end, and a lid closing the circumferential wall at a second end opposite the bottom, wherein the wall, bottom and lid enclose an inner space comprising the extractable product, the lid comprising a flexible sheet of perforate and/or porous material;

wherein the fluid dispensing device is arranged for supplying the fluid to the extractable product through the bottom for forming the beverage, wherein the receptacle comprises a support surface, and wherein the exchangeable open capsule is arranged to at least partly abut against the support surface for draining the prepared beverage from the exchangeable open capsule through the lid and through the support surface, the apparatus comprises an outlet which, in use, is in fluid communication with the lid for draining the prepared beverage from the exchangeable open capsule and supplying the beverage to a container, wherein the lid comprises an impermeable outer circumferential area and an exit area being surrounded by said impermeable outer circumferential area such that the prepared beverage is drained from the exchangeable open capsule through the exit area, wherein a separate member forms an additional substantially annular sealing member that forms the impermeable outer circumferential area of the lid and is attached to the side of the sheet facing the support surface, said additional substantially annular sealing member extending radially inward from the circumferential wall, wherein when the exchangeable open capsule is received in the flexible receptacle, the impermeable outer circumferential area extends radially inward relative to the support surface such that the exit area is aligned with the outlet of the apparatus;

wherein the apparatus comprises a piercing member, wherein the lid of the exchangeable open capsule is sufficiently strong and sufficiently stiff not to be pierced by the piercing member under the influence of the pressure inside the exchangeable open capsule.

2. The apparatus of claim 1, wherein the flexible sheet-shaped perforate and/or porous material is a flexible foil at least partly provided with a plurality of exit openings.

3. The apparatus of claim 2, wherein the flexible foil is a multilayer foil of polyethyleneterephthalate (PET-P) and chlorinated polypropylene (CPP).

4. The apparatus of claim 3, wherein the flexible foil comprises a first layer of polyethyleneterephthalate (PET-P) with a thickness of approximately 15 μm and a second layer of chlorinated polypropylene (CPP) of approximately 30 μm.

5. The apparatus claim 2, wherein the plurality of exit openings are provided in a centre area of the lid, wherein the impermeable outer circumferential area of the lid does not comprise any exit opening.

6. The apparatus of claim 1, wherein the lid and the annular sealing member are of the same material.

7. The apparatus of claim 1, wherein the annular sealing member is of a resilient material.

8. The apparatus of claim 1, wherein the exchangeable open capsule comprises an outwardly extending rim, wherein the lid is attached to the outwardly extending rim.

9. The apparatus of claim 8, wherein a radial length of the outwardly extending rim at a side facing the lid is approximately 4.7 mm±0.1 mm.

10. The apparatus of claim 1, wherein the exit area comprises 90-150 openings.

11. The apparatus of claim 1, wherein the bottom of the exchangeable open capsule is permeable to liquid.

12. The apparatus of claim 11, wherein the bottom of the exchangeable open capsule is perforate and/or porous.

13. The apparatus of claim 1, wherein the exit area includes 100-125 openings.

14. The apparatus of claim 1, wherein an opening diameter is approximately 0.3 mm±0.05 mm.

15. The apparatus of claim 2, wherein the flexible foil is a polymeric film.

16. The apparatus of claim 7, wherein the annular sealing member is a plastic material.

17. The apparatus of claim 16, wherein the annular sealing member is at least one of PE and a rubber.

18. A method for preparing a predetermined quantity of beverage suitable for consumption using an extractable product, comprising:

providing an exchangeable open capsule, comprising a circumferential wall, a bottom closing the circumferential wall at a first end, and a lid closing the circumferential wall at a second end opposite the bottom, wherein the wall, bottom and lid enclose an inner space comprising the extractable product, providing an apparatus comprising a receptacle for holding the exchangeable open capsule, a fluid dispensing device for supplying an amount of a fluid under pressure to the exchangeable open capsule, and an outlet which, in use, is in fluid communication with the exchangeable open capsule for draining the prepared beverage from the exchangeable open capsule and supplying the beverage to a container, wherein the receptacle comprises a support surface, and wherein the exchangeable open capsule at least partly abuts against the support surface for draining the prepared beverage from the exchangeable open capsule through the lid and through the support surface, wherein the lid comprises a flexible sheet of perforate and/or porous material and the apparatus comprises an outlet which is in fluid communication with the lid for draining the prepared beverage from the exchangeable open capsule and supplying the beverage to a container, wherein the lid comprises an impermeable outer circumferential area and an exit area being surrounded by said impermeable outer circumferential area such that the prepared beverage is drained from the exchangeable open capsule through the exit area, wherein a separate member forms an additional substantially annular sealing member that forms the impermeable outer circumferential area of the lid and is attached to a side of the flexible sheet facing the support surface, said additional substantially annular sealing member extending radially inward from the circumferential wall, wherein when the exchangeable open capsule is received in the receptacle, the impermeable outer circumferential area extends radially inward relative to the support surface such that the exit area is aligned with the outlet of the apparatus, wherein the method further comprises supplying the fluid to the extractable product for preparing the beverage; and wherein the apparatus comprises a piercing member, wherein the lid of the exchangeable open capsule is sufficiently strong and sufficiently stiff not to be pierced by the piercing member under the influence of the pressure inside the capsule.

19. The method of claim 18, wherein the fluid dispensing device is arranged for supplying the fluid to the extractable product through the bottom for forming the beverage.

20. The method of claim 18, wherein the exit area includes 90-150 openings.

21. The method of claim 18, wherein the exit area includes 100-125 openings.

22. The method of claim 18, wherein an opening diameter is approximately 0.3 mm±0.05 mm.

\* \* \* \* \*